(12) United States Patent
Ludwig et al.

(10) Patent No.: US 10,291,508 B2
(45) Date of Patent: May 14, 2019

(54) OPTIMIZING MONITORING FOR SOFTWARE DEFINED ECOSYSTEMS

(71) Applicant: International Business Machines Corporation, Armonk, NY (US)

(72) Inventors: Heiko Ludwig, San Francisco, CA (US); Nagapramod S. Mandagere, San Jose, CA (US); Mohamed Mohamed, San Jose, CA (US); Aikaterini Stamou, Salonika (GR)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 15/070,078

(22) Filed: Mar. 15, 2016

(65) Prior Publication Data
US 2017/0272348 A1    Sep. 21, 2017

(51) Int. Cl.
*H04L 12/26* (2006.01)
*H04L 29/08* (2006.01)
*H04L 12/803* (2013.01)

(52) U.S. Cl.
CPC .......... *H04L 43/14* (2013.01); *H04L 43/0817* (2013.01); *H04L 47/125* (2013.01); *H04L 67/10* (2013.01); *H04L 67/1023* (2013.01); *H04L 67/1097* (2013.01)

(58) Field of Classification Search
CPC ... H04L 43/0817; H04L 43/14; H04L 47/125; H04L 67/1023
See application file for complete search history.

(56) References Cited

U.S. PATENT DOCUMENTS

| 7,209,473 | B1* | 4/2007 | Mohaban | H04L 41/0213 370/352 |
| 7,873,979 | B1* | 1/2011 | Foote | H04N 21/235 725/109 |
| 7,904,887 | B2 | 3/2011 | Franaszek et al. | |
| 8,136,106 | B2 | 3/2012 | Franaszek et al. | |
| 8,201,191 | B2* | 6/2012 | Ladd | H04L 63/10 709/229 |

(Continued)

FOREIGN PATENT DOCUMENTS

WO    2014081608    5/2014

OTHER PUBLICATIONS

Anonymous, An Integrated Systems Appliance for the Collection, Classification and Scoring of Software Lifecycle Quality Data Sets, Jun. 18, 2013.

(Continued)

*Primary Examiner* — Davoud A Zand
(74) *Attorney, Agent, or Firm* — Lieberman & Brandsdorfer, LLC (57) ABSTRACT

The embodiments described herein relate to dynamically optimizing a mapping from applications to shared service providers via one or more monitoring modules. A software layer positioned between a set of requestor applications and a set of shared service providers is configured. The layer is populated with a collection of one or more monitoring modules, with each monitoring module configured to monitor application resource usage. In response to receiving a monitoring request from the set of requestor applications, a mapping of the received request to the collection of xlets is dynamically optimized.

20 Claims, 7 Drawing Sheets

(56) References Cited

U.S. PATENT DOCUMENTS

| | | | | |
|---|---|---|---|---|
| 8,442,030 | B2* | 5/2013 | Dennison | H04L 12/4625 370/217 |
| 9,473,827 | B2* | 10/2016 | Ladd | H04L 63/10 |
| 2006/0020950 | A1* | 1/2006 | Ladd | H04L 63/10 719/328 |
| 2006/0165040 | A1* | 7/2006 | Rathod | G06Q 10/10 370/335 |
| 2008/0134165 | A1* | 6/2008 | Anderson | G06F 8/65 717/173 |
| 2011/0179443 | A1* | 7/2011 | Calzone | H04L 12/2801 725/28 |
| 2012/0311023 | A1* | 12/2012 | Ladd | H04L 63/10 709/203 |
| 2014/0269425 | A1* | 9/2014 | Fisher | H04L 41/0809 370/254 |

OTHER PUBLICATIONS

Anonymous, Persuasive Software Method Adoption and Standardization, Jan. 24, 2013.

* cited by examiner

OPTIMIZING MONITORING FOR SOFTWARE DEFINED ECOSYSTEMS

BACKGROUND

The present embodiments relate to mapping an application to a distributed and shared resource model. More specifically, the embodiments relate to management of software defined monitors employed in applications supported by shared services and infrastructures.

Economies of scale, agility, availability, and on-demand pricing models have enabled a variety of application deployment models, suiting different needs of different organizations. Applications commonly span across on-premises, public cloud, and private cloud, either directly or indirectly through platforms they operate on or services they consume.

Shared services and infrastructures that back applications are commonly managed by multiple Infrastructure as a Service (IaaS) providers and/or Platform as a Service (PaaS) providers, depending on the type of deployment. From the perspective of the application, this distributed and shared resource model necessitates monitoring of application resource usage to ensure proper support and performance tuning of the application(s). Several solutions exist to support the resource model monitoring. One such solution includes a system that polls the status of a monitored target. Another solution employs data collectors and maintains or manually re-configures application resource assignment. However, these solutions do not account for recycling monitoring tools and facilities that have already been deployed by associating the deployed tools for new applications. More specifically, the solutions that are known and employed are static and are not designed to dynamically accommodate expansion of one or more deployed applications, including scalability with respect to a new application.

SUMMARY

The aspects described herein include a method, computer program product, and system for dynamically optimizing a mapping between one or more applications and one or more monitoring modules positioned in a software layer in communication with one or more shared service providers.

According to one aspect, a method is provided for dynamically optimizing a mapping from applications to shared service providers. A software layer positioned between a set of requestor applications and a set of shared service providers is configured. The layer is populated with a collection of one or more xlets, with each xlet being a set of monitoring modules to monitor application resource usage. In response to receiving a monitoring request from the set of requestor applications, a mapping of the received request to the collection of xlets is dynamically optimized.

According to another aspect, a computer program product is provided to dynamically optimize a mapping from application to shared service providers. The computer program product includes a computer readable storage device having computer readable program code embodied therewith. The program code is executable by a process to configure a software layer positioned between a set of requestor applications and a set of shared service providers. The layer is populated with a collection of one or more xlets, with each xlet being a set of monitoring modules to monitor application resource usage. In response to receiving a monitoring request from the set of requestor applications, a mapping of the received request to the collection of xlets is dynamically optimized.

According to yet another aspect, a system is provided to dynamically optimize a mapping from applications to shared service providers. The system includes a processor in communication with memory. The system further includes a tool in communication with the processor. The tool includes one or more modules to configure a software layer positioned between a set of requestor applications and a set of shared service providers. The layer is populated with a collection of one or more xlets, with each xlet being a set of monitoring modules to monitor application resource usage. In response to receiving a monitoring request from the set of requestor applications, a mapping of the received request to the collection of xlets is dynamically optimized.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein form a part of the specification. Features shown in the drawings are meant as illustrative of only some embodiments, and not of all embodiments unless otherwise explicitly indicated.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 1:
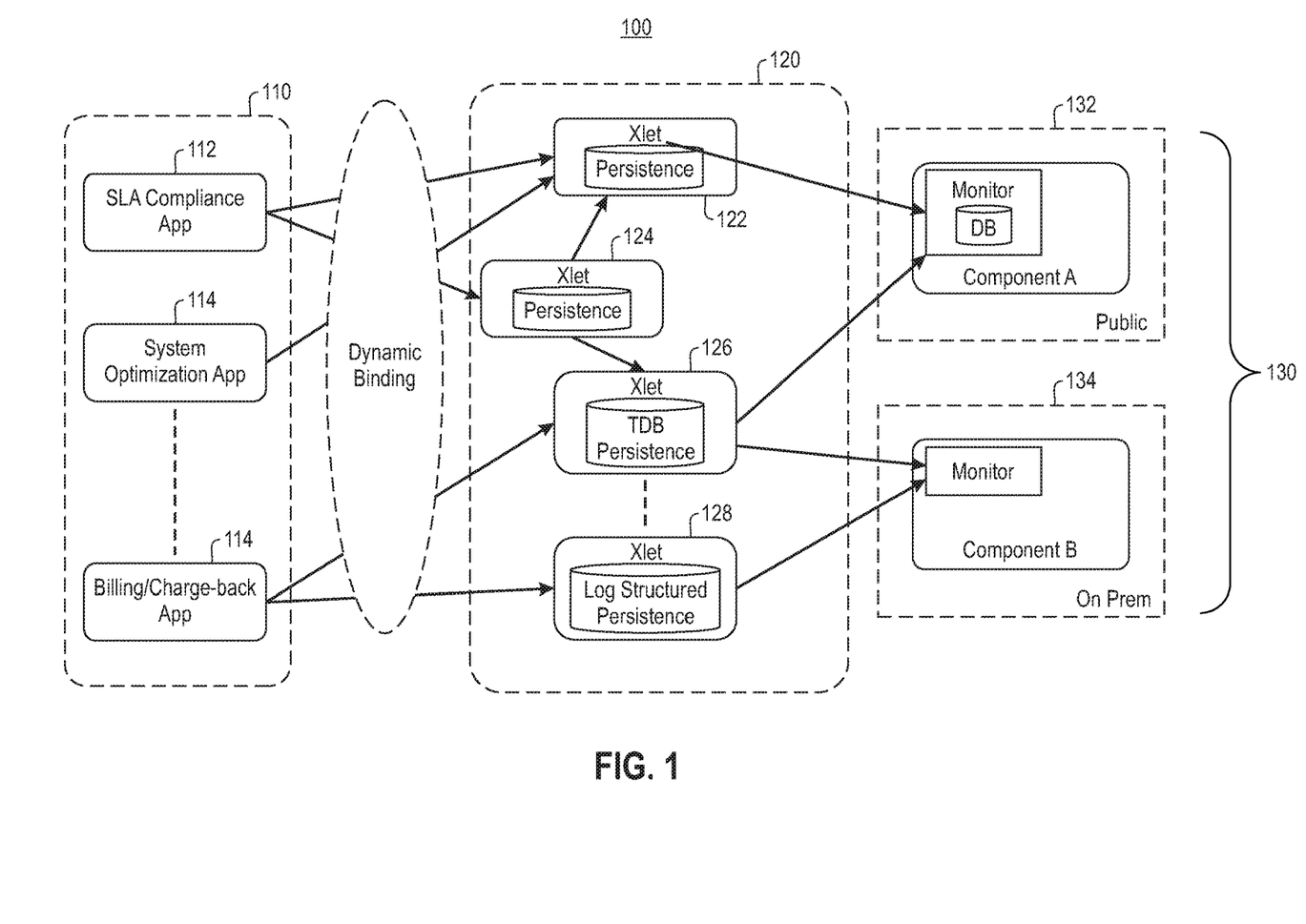
FIG. 1 depicts a block diagram illustrating an abstract view of applications as supported by the shared resource providers.

With reference to FIG. 1, a block diagram (100) is provided illustrating an abstract view of one or more applications as supported by shared resource providers. As shown, there are three regions, including a first region (110) associated with client based applications, a second region (120) associated with software defined monitors, and a third region (130) representing providers, which in one embodiment may be different forms of remote shared resources, also referred to herein as cloud based resources.

The first region (110) is shown to originally include two applications (112) and (114), and may be expanded to include one or more additional applications (116). The original applications are shown as a service level agreement (SLA) compliance application (112), and a system optimization application (114). The additional application (116) is shown as a billing charge-back application. Applications (112)-(116) are merely examples of applications, and should not be considered limiting. Each application in the first region (110) is supported by one or more providers in the third region (130).

As shown, the third region (130) represents remote shared resource providers, also referred to herein as cloud based resource providers, service providers, or providers. In this example, the providers include a public provider (132) and an on premises, or private provider (134). Similar to the applications of the first region (110), the providers shown in the third region (130) are merely exemplary and should not be construed as limiting forms of providers.

The second region (120) is shown in the form of one or more software defined monitors. A smart monitoring framework, as shown in the second region (120), is composed of a collection of light weight software defined monitoring modules (122)-(128). Each monitoring module is also referred to herein as an xlet. In one embodiment, each xlet is a monitoring adaptor built for a specific purpose. For example, one xlet may specialize in providing optimized access to processor monitoring information for a specific cloud provider. In another example, another xlet may specialize in providing time series aggregates on the same processor information. Similarly, multiple xlets may be connected recursively to achieve complex monitoring requirements. In one embodiment, one or more xlets in the second region (120) are selected from a library (not shown) of xlets. Accordingly, as shown herein, the xlets are populated in the second region (120) as monitoring tools of one or more providers in the third region (110) supporting one or more applications in the first region (110).

In the example shown herein, the second region (120) is originally configured with three xlets, which have been labeled $xlet_A$ (122), $xlet_B$ (124), and $xlet_C$ (126). Each xlet is mapped to at least one of the applications (112)-(116) in the first region (110), and to at least one of the providers (132) and (134) in the third region (130). As applications in the first region (110) expand, or as monitoring requirements for existing applications change or expand, such as with addition of application (116), the quantity of xlets in the second region (120) may similarly expand, such as by addition of new xlet (128). By way of example, application (116) represents an added application, and $xlet_D$ (128) represents an additional xlet added to the second region (120) to at least support application (116) in view of existing applications (112) and (114). In one embodiment, xlet (128) is selected from a library of xlets to ensure that xlet (128) is properly mapped to the functionality of application (116). Any xlet added in response to the change or expansion of monitoring requirements, such as $xlet_D$ (128), is selected to ensure appropriate functional support of the applications and the resource providers. Accordingly, as shown, the second region (120) functions as a layer binding one or more xlets between an application(s) and a provider(s).

The xlets of FIG. 1 are shown and described populated in a software layer and mapped between at least one application and at least one resource provider. The mapping may be a direct correspondence in which each xlet may be exclusive to an application, exclusive to a provider, or shared either among two or more applications or two or more providers. Similarly, in one embodiment, the xlets may be nested. An example of a nested configuration is $xlet_A$ (122) to manage $metric_A$, $xlet_B$ (124) to manage $metric_B$, and $xlet_C$ (126) to manage an aggregation or combination of $metric_A$ and $metric_B$. In one embodiment, there is a form of redundancy in the selection and activation of the xlets to provide either direct or indirect correspondence, regardless of whether or not the xlets are nested. Namely, to avoid a single point of failure, at least two redundant paths of monitoring data between the application and the provider may be employed.

Figure 2:
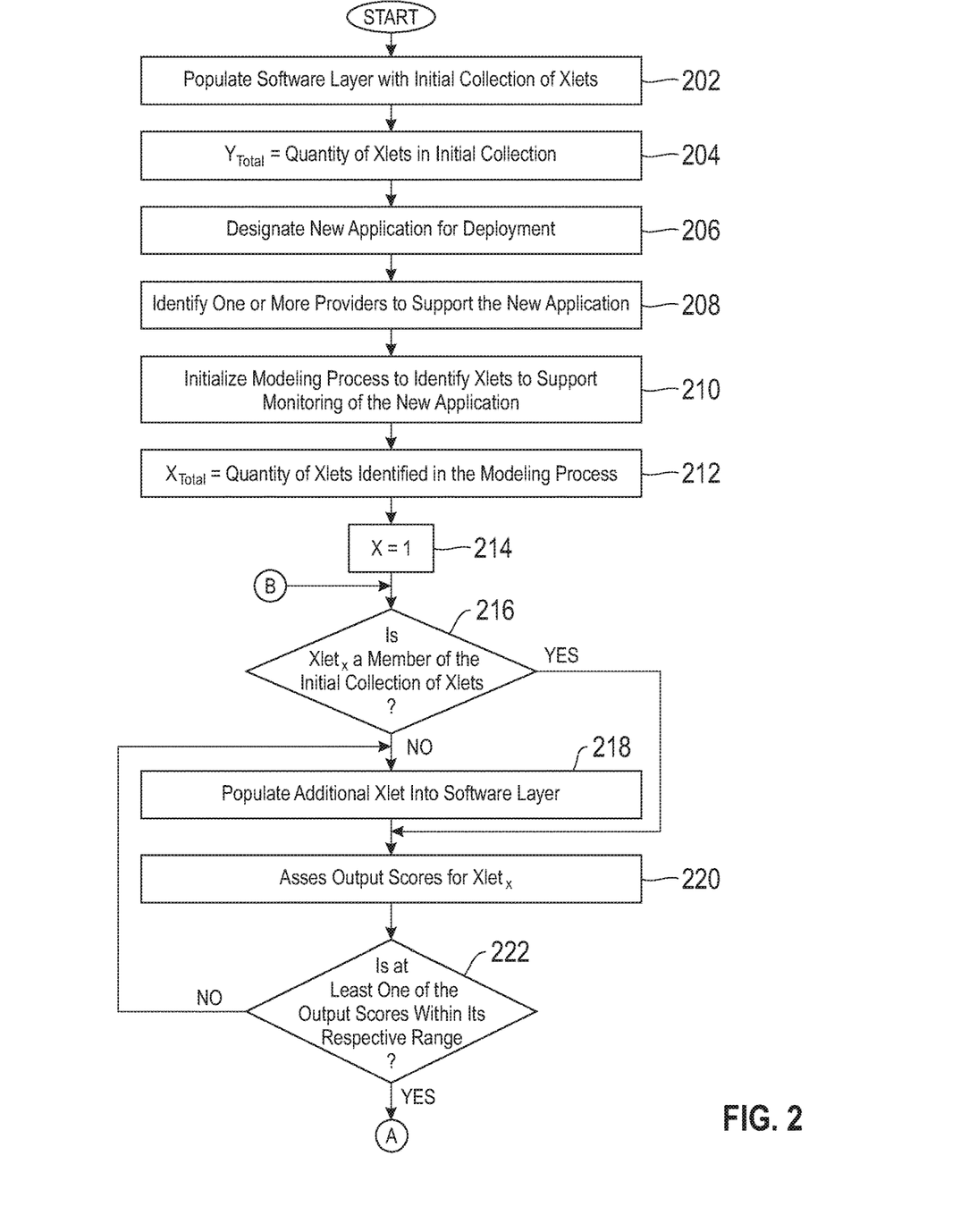
FIG. 2 depicts a flowchart illustrating a process for modeling and managing a software monitoring region.

The selection and assignment of xlets in the second region (120) are not statically defined. For example, and in on embodiment, if a new application is being deployed, the selection and assignments may be dynamically adjusted to support the new application. Referring to FIG. 2, a flow chart (200) is provided illustrating a process for modeling and managing the software monitoring region. The software layer is shown herein populated with an initial collection of xlets (202). In one embodiment, the software layer is initialized with a base quantity of xlets, which over time may be expanded based on requirements associated with the deployed applications. For instance, expansion may be performed to address supplemental or complementary functionality, and/or redundant functionality for load balancing, as will be further discussed below. The variable $Y_{Total}$ is assigned to the base number of xlets in the initial collection populated in the software layer (204).

As a new application is designated for deployment in the software layer (206), one or more providers to support the new application are identified (208). Different applications and different providers may have varying monitoring needs, and the monitoring itself may be based on characteristics of the application and/or functionality of the provider(s). At the same time, each xlet uses resources and takes up load on the system when monitoring. In one embodiment, the combined footprint of multiple xlets is maintained at a minimum. Accordingly, there is a load balance aspect associated with xlet management.

Prior to deploying the application, a modeling process to identify the xlets to support monitoring of the new application is initialized (210). In one embodiment, each xlet may support specific monitoring functions, and as such, an xlet in the initial collection may or may not support the application being deployed. More specifically, the monitoring function of each xlet currently deployed in the software layer as part of the initial collection, or in one embodiment as part of an expansion within the software layer, is evaluated with respect to the new application designated for deployment. Additionally, the projected load on each xlet is evaluated with respect to the new application to be deployed. In one embodiment, the modeling process may be performed by an xlet modeler component. Part of the modeling process includes identifying xlets that may be mapped to support the application, as well as identifying xlets that may need to be added to the software layer to support the application.

Populating the software layer with monitoring modules requires a balance between support of the applications in the first region and load on the second region.

The variable $X_{Total}$ is assigned to the quantity of xlets identified in the modeling process (212), and an associated counting variable is initialized (214). For each of the xlets identified in the modeling, it is determined if they are members of the initial population, e.g. $Y_{Total}$, of xlets in the software layer (216). In one embodiment, $xlet_X$ may not be in the initial collection already populating the software layer, per se, but an xlet with similar or redundant functionality may be a member of that initial collection. In that case, the test at step (216) may be expanded to include determining if $xlet_X$ has a functionality that is similar, or redundant, to a member of the initial collection.

If at step (216) it is determined that $xlet_X$, or in one embodiment, the functionality of $xlet_X$, is present in the initial collection, then that xlet present in the initial collection is selected. However, if at step (216) it is determined that $xlet_X$, or in one embodiment, the functionality of $xlet_X$, is not present in the initial collection, an additional xlet from a source outside of the initial collection, such as a library of monitoring modules, is selected for population into the software layer (218). In one embodiment, step (218) includes selecting an additional xlet that is either the specific xlet type, or that supports the function of $xlet_X$, from the library of xlets.

Prior to populating the selected xlet into the software layer, an assessment is conducted with respect to the feasibility and sustainability of the proposed addition. Specifically, following the xlet selection at step (218) or an affirmative response to step (216), an assessment is conducted with respect to the feasibility and sustainability of the selected $xlet_X$ or the additional xlet being populated into the software layer (220). In one embodiment, the assessment includes calculating and outputting one or more scores for the selected $xlet_X$ or the additional xlet from step (218). In one embodiment, the one or more output scores include a suitability score and an expected cost score. The expected cost score may be associated with an incremental cost. In one embodiment, the expected cost score pertains to load balancing and response time. In one embodiment, a range is provided for each score, respectively, with respect to the application being deployed. It is to be understood that the suitability score and expected cost score are exemplary scores output at step (220), and it is to be appreciated that one or more alternative or additional scores may be output for the xlet at step (220).

Following strep (220), it is determined if at least one of the output scores is within its respective range (222). For example, it may be determined if the suitability score is within its respective range, and if the expected cost score is within its respective range. A non-affirmative response to the determination at step (222) is followed by a return to step (218) to select a different xlet from the library for potential population to the software layer. Accordingly, if the xlet being evaluated does not fit within either defined range, then the evaluation process continues to search for an xlet that can support the application while meeting the configuration of the software layer.

An affirmative response to the determination at step (222), i.e., if one or both of the scores in the modeling process are within the defined range(s), the selected xlet under evaluation is populated into the software layer and mapped to the new application being deployed (224). The process for modeling takes place for each xlet or class of xlets designated for the subject application. Following step (224), the xlet counting variable X is incremented (226), and it is determined if each of the identified xlets have been evaluated (228). An affirmative response to the determination at step (228) concludes the evaluation of application deployment, and a non-affirmative response is following by a return to step (216). Accordingly, a modeling function may be performed as part of xlet mapping, such as in response to the deployment of a new application.

As shown and described in FIG. 2, modeling of one or more xlets may be performed. In addition, a management function may also be performed as part of the xlet mapping. The management function includes an assessment of the mapped xlets to ensure optimal mapping assignments by dynamically analyzing resource utilization resources. In one embodiment, the mapping of xlets to applications is dynamically optimized by use of an optimizer. For example, the xlet modeler component is configured to output the one or more scores to formulate the monitoring request to the xlets as an optimization problem, and an optimizer component receives the output scores, along with the monitoring request, to dynamically optimize the mapping of the received request.

Figure 3:
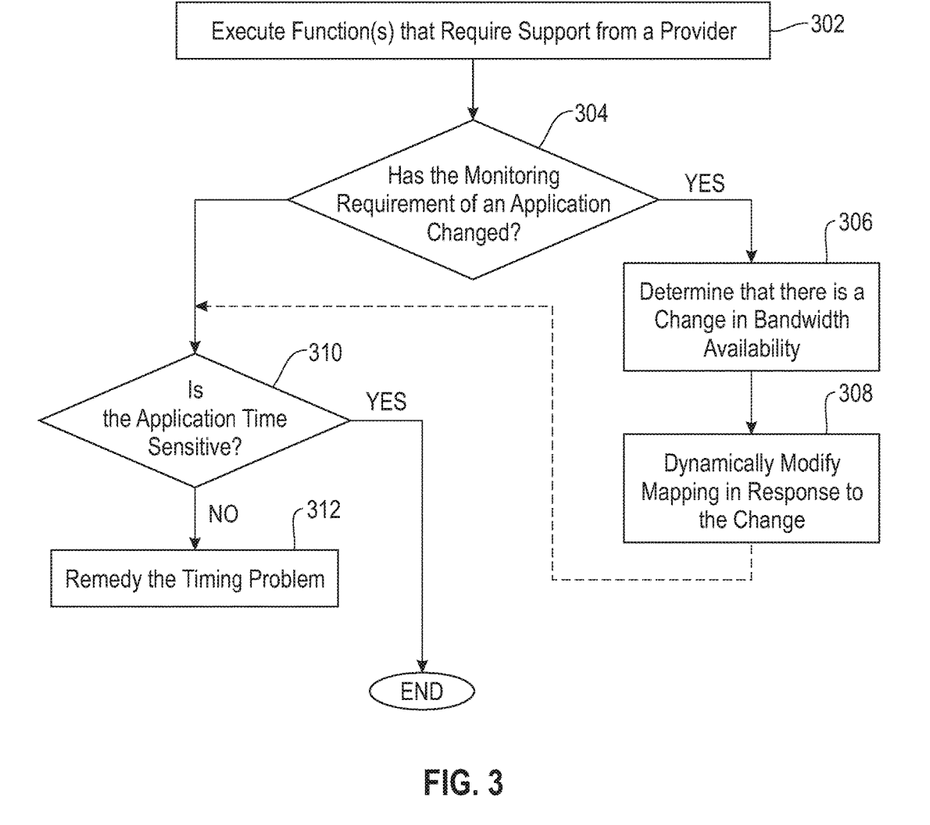
FIG. 3 depicts a flowchart illustrating an exemplary process for dynamic and continuous management of a deployed application.

As shown in FIG. 2, deployment of a new application includes mapping the application with one or more service providers, and one or more monitoring modules in the software layer. Each application is designated with at least one service provider and at least one monitoring module. Once the application has been deployed, management and modeling of the xlet with respect to the application is dynamic and continuous. Referring to FIG. 3, a flow chart (300) is provided illustrating an example process of dynamic and continuous management of a deployed application. The application may execute one or more functions that require support from the mapped service provider (302).

The monitoring requirements of one application may change after execution of the function at step (302) in response to changes observed in the environment. Such changes may include a change in resource availability, a change in workload requirements, etc. A change corresponding to anincrease in the requirements may limit available bandwidth, and a change corresponding to a decrease in the requirements may expand the available bandwidth. As such, following step (302) an assessment is conducted to determine if there are any changes in monitoring requirements (304). For example, if at step (304) it is determined that there is a change (306), the mapping is dynamically modified in response to the change (308). For example, if the assessment at step (304) determines that the changes include a decrease in available bandwidth, step (308) may include adding an additional or redundant xlet to the layer and/or remapping the applications and associated xlets. In one embodiment, step (308) includes identifying another xlet in the layer with similar functionality and sufficient bandwidth to satisfy and maintain the deployed application. Conversely, if the assessment at step (304) determines that the changes include an increase in available bandwidth, step (308) may include removing a redundant xlet from the layer and/or remapping the applications and associated xlets. In one embodiment, the redundant xlet is removed from the layer with the support provided by one or more xlets subject to the remapping. Accordingly, one or more new monitoring modules may be spawned to the software layer responsive to an increased demand on the collection of monitoring modules.

A negative response to the determination at step (304) is followed by assessing whether the application is a time-sensitive application (310), such that the application requires that a response from the service provider be provided at least at a certain speed. In one embodiment, completion of the modified mapping at step (308) may be followed by further assessment of the application with respect to time sensitivity. The xlet mapped to the application tracks the time it takes for the application to receive a provider-supported response. In this example, at step (310) it is determined if the tracked time is within a defined range or a predetermined threshold time value. An affirmative response to the determination at step (310) indicates that the communication between the deployed application and the providers is adequate, and there is no need to modify the current assignments with the service provider(s) based on the tracked time.

However, a non-affirmative response to the determination at step (310) indicates that the current assignment with the service provider is not adequately supporting the requirements of the time-sensitive application, and the timing problem is remedied (312), which in one embodiment may take on different forms. For example, in one embodiment, an issue associated with the current xlet assignments may be the source of the timing problem, such as a failed xlet, or an xlet that is supporting too many applications. In another embodiment, the source of the issue may be with the service provider, and the application may need to be mapped to a different provider with the bandwidth or capacity to support the application within the terms of the service support required. In the case of a failed xlet, the remedy may include replacing the current xlet, which would be followed with either mapping the application to an xlet that is already deployed in the software layer with capacity to support the application, or deploying a new application to the software layer. In the case of the xlet having an excess load, the remedy may include providing a redundant xlet to support the application. In one embodiment, the xlet may be supporting more than one application, and an increase load from one application may cause the load for another application to be excessive.

Figure 4:
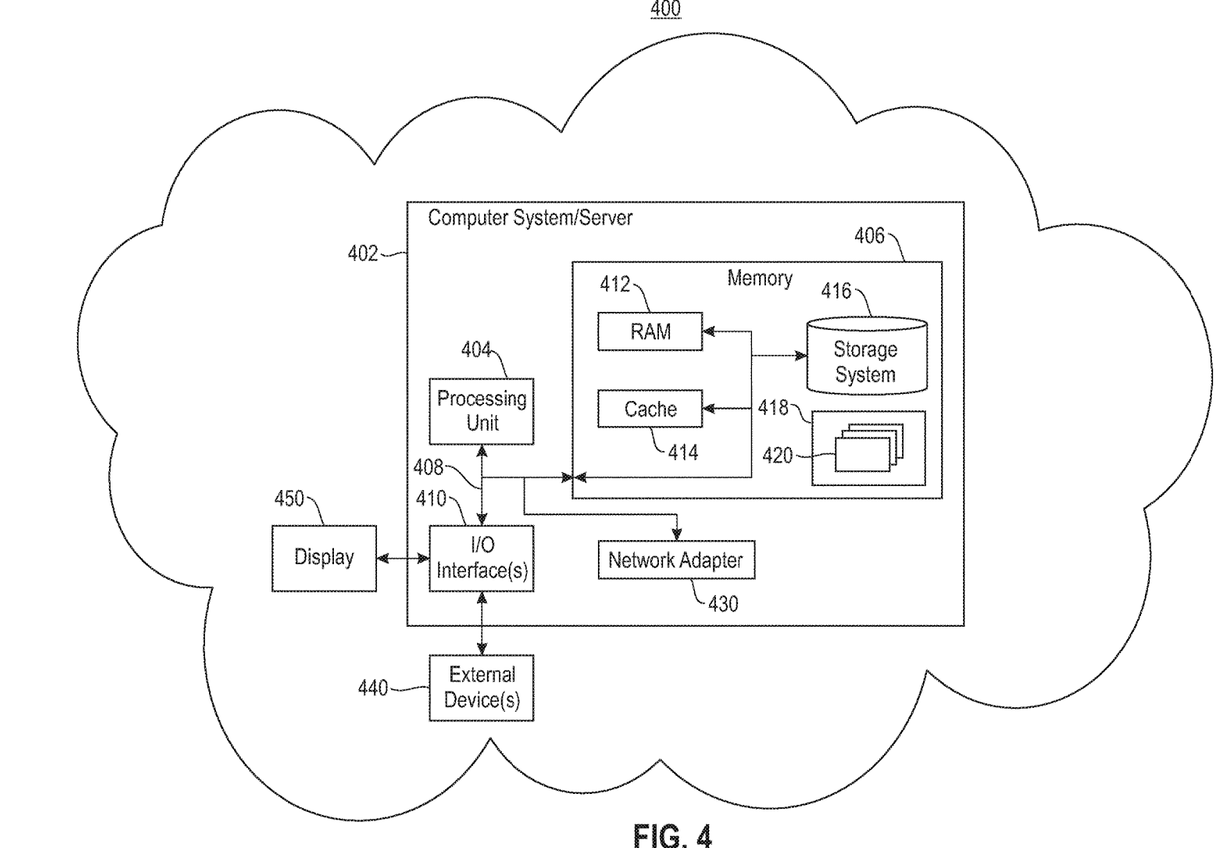
FIG. 4 depicts a block diagram illustrating an example of computer system/server for software defined monitoring.

The embodiments described above may be implemented in a computer system to handle resource monitoring requests. With reference to FIG. 4, a block diagram (400) is provided illustrating an example of computer system/server (402), hereinafter referred to as a host (402) for software defined monitoring. Host (402) is operational with numerous other general purpose or special purpose computing system environments or configurations. Examples of well-known computing systems, environments, and/or configurations that may be suitable for use with host (402) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and filesystems (e.g., distributed storage environments and distributed cloud computing environments) that include any of the above systems or devices, and the like.

Host (402) may be described in the general context of computer system-executable instructions, such as program modules, being executed by a computer system. Generally, program modules may include routines, programs, objects, components, logic, data structures, and so on that perform particular tasks or implement particular abstract data types. Host (402) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, host (402) is shown in the form of a general-purpose computing device. The components of the host (402) may include, but are not limited to, one or more processors or processing units (404), system memory (406), and a bus (408) that couples various system components including system memory (406) to processor (404). Bus (408) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (402) typically includes a variety of computer system readable media. Such media may be any available media that is accessible by the host (402) and it includes both volatile and non-volatile media, removable and non-removable media.

Memory (406) can include computer system readable media in the form of volatile memory, such as random access memory (RAM) (412) and/or cache memory (416). Host (402) further includes other removable/non-removable, volatile/non-volatile computer system storage media. By way of example only, storage system (416) is shown providing reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (408) by one or more data media interfaces. As will be further depicted and described below, memory (406) may include at least one program product having a set (e.g., at least one) of program modules that are configured to carry out the functions of the embodiments described above with reference to FIGS. 1-3.

Program/utility (416), having a set (at least one) of program modules (420), may be stored in memory (406) by way of example, and not limitation, as well as an operating system, one or more application programs, other program modules, and program data. Each of the operating systems, one or more application programs, other program modules, and program data or some combination thereof, may include an implementation of a networking environment. Program modules (420) generally carry out the functions and/or methodologies of embodiments as described herein. For example, the set of program modules (420) may include at least one module that is configured to configure a software layer positioned between a set of requestor applications and a set of shared service providers, populate the layer with a collection of one or more sets of monitoring modules ("xlets") to monitor application resource usage, dynamically optimize a mapping of a received monitoring request from the set of requestor application to the collection of xlets, and dynamically manage the mappings of xlets after deployment based on changes in the environment.

Host (402) may also communicate with one or more external devices (440), such as a keyboard, a pointing device, etc.; a display (450); one or more devices that enable a user to interact with the host (402); and/or any devices (e.g., network card, modem, etc.) that enable the host (402) to communicate with one or more other computing devices. Such communication can occur via Input/Output (I/O) interface(s) (402). Still yet, the host (402) can communicate with one or more networks such as a local area network (LAN), a general wide area network (WAN), and/or a public network (e.g., the Internet) via network adapter (430). As depicted, network adapter (430) communicates with the other components of the host (402) via bus (408).

It should be understood that although not shown, other hardware and/or software components could be used in conjunction with the host (402). Examples, include, but are not limited to: microcode, device drivers, redundant processing units, external disk drive arrays, RAID systems, tape drives, and data archival storage systems, etc.

The host of FIG. 4 may be embodied in a cloud computing architecture as a cloud computing node. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. One or more components of the host may be configured with a communication platform that supports communication with externally available shared resources (e.g. cloud supported products and services), also referred to herein as a cloud model. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
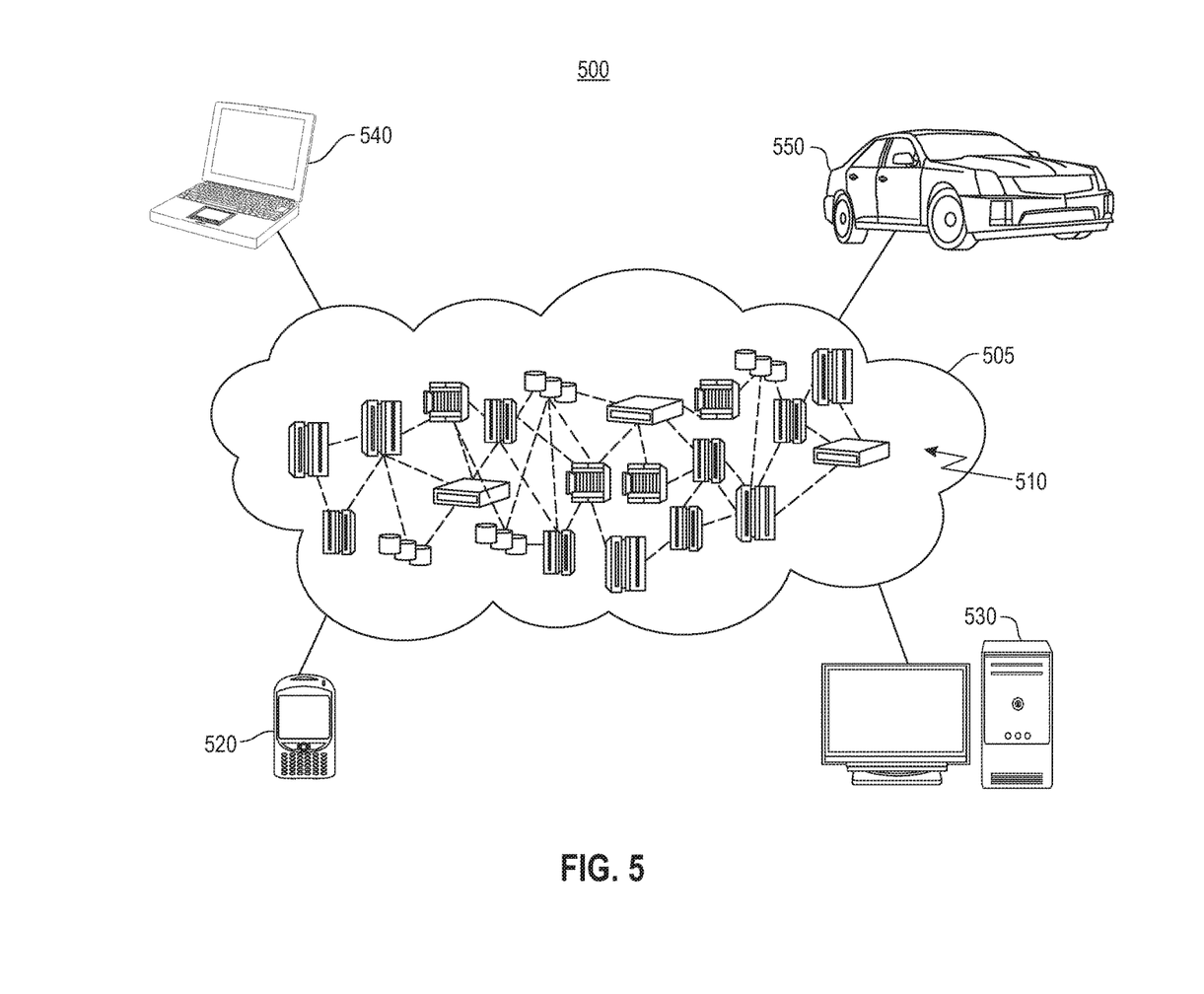
FIG. 5 depicts a block diagram illustrating an exemplary cloud computing environment.

Referring now to FIG. 5, an illustrative cloud computing environment 600 is depicted. As shown, cloud computing environment (600) comprises one or more cloud illustrating computing nodes (510) with which local computing devices used by cloud consumers, such as, for example, personal digital assistant (PDA) or cellular telephone (554A), desktop computer (554B), laptop computer (554C), and/or automobile computer system (554N) may communicate. Nodes (510) may communicate with one another. They may be grouped (not shown) physically or virtually, in one or more networks, such as Private, Community, Public, or Hybrid clouds as described hereinabove, or a combination thereof. This allows cloud computing environment (500) to offer infrastructure, platforms and/or software as services for which a cloud consumer does not need to maintain resources on a local computing device. It is understood that the types of computing devices (554A)-(554N) shown in FIG. 5 are intended to be illustrative only and that computing nodes (510) and cloud computing environment (500) can communicate with any type of computerized device over any type of network and/or network addressable connection (e.g., using a web browser).

Figure 6:
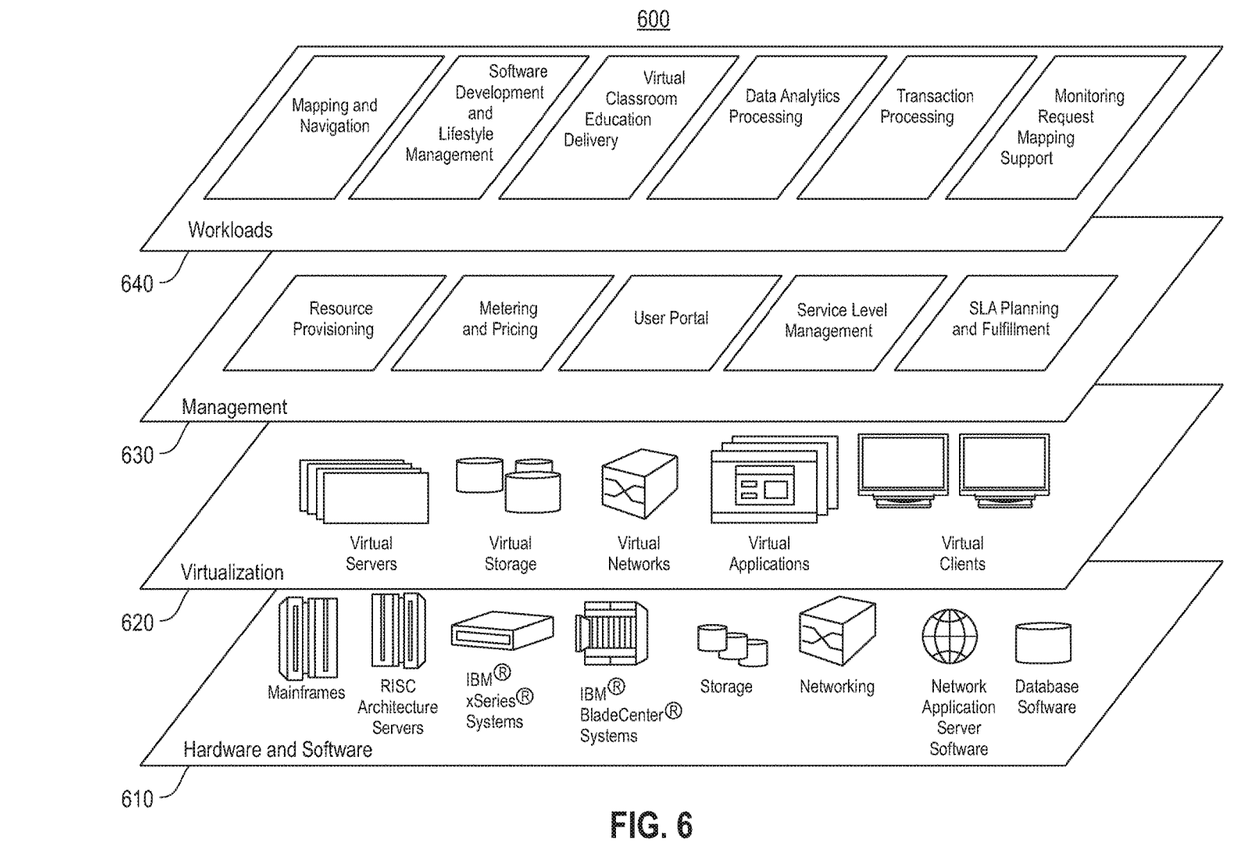
FIG. 6 depicts a diagram illustrating a set of abstraction layers provided by the cloud computing environment of FIG. 5.

Referring now to FIG. 6, a set of functional abstraction layers (600) provided by a cloud computing environment of FIG. 5 is shown. It should be understood in advance that the components, layers, and functions shown in FIG. 6 are intended to be illustrative only and embodiments of the invention are not limited thereto. As depicted, the following layers and corresponding functions are provided:

Hardware and software layer (610) includes hardware and software components. Examples of hardware components include mainframes; RISC (Reduced Instruction Set Computer) architecture based servers; servers; blade servers; storage devices; networks and networking components. In some embodiments, software components include network application server software and database software.

Virtualization layer (620) provides an abstraction layer from which the following examples of virtual entities may be provided: virtual servers; virtual storage; virtual networks, including virtual private networks; virtual applications and operating systems; and virtual clients.

In one example, management layer (630) may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (640) provides examples of functionality for which the cloud computing environment may be utilized. Examples of workloads and functions which may be provided from this layer include: mapping and navigation; software development and lifecycle management; virtual classroom education delivery; data analytics processing; transaction processing; and monitoring request mapping support within the cloud computing environment.

The aspects described herein may be embodied in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method comprising:
    configuring a software layer positioned between a requestor application and a shared service provider;
    populating the layer with a collection of one or more monitoring modules, wherein each monitoring module monitors application resource usage and each monitoring module is an xlet configured for a specific purpose, wherein selection and activation of the xlet provides at least two redundant paths of monitoring data; and
    in response to receiving a monitoring request from the requestor application, dynamically optimizing a mapping of the received request to the collection of monitoring modules.

2. The method of claim 1, wherein dynamically optimizing the mapping comprises computing a suitability score and an expected cost projected for each monitoring module of the collection.

3. The method of claim 2, wherein the suitability score is derived from a combination of monitoring module attributes, the attributes including functional overlap, persistent suitability, and availability.

4. The method of claim 2, wherein dynamically optimizing the mapping further comprises selecting at least one monitoring module from the collection satisfying the suitability score.

5. The method of claim 1, further comprising dynamically managing the layer, including load balancing the monitoring modules in the layer.

6. The method of claim 5, further comprising spawning one or more new monitoring modules to the layer responsive to an increased demand on the collection of monitoring modules.

7. The method of claim 1, wherein the two paths of monitoring data provides redundancy in selection and activation of the xlets to avoid a single point of failure.

8. A computer program product comprising a computer readable storage device having computer readable program code embodied therewith, the program code executable by a processor to:
    configure a software layer positioned between a requestor application and a shared service provider;
    populate the layer with a collection of one or more monitoring modules, wherein each monitoring modules monitors application resource usage and each monitoring module is an xlet configured for a specific purpose, wherein selection and activation of the xlet provides at least two redundant paths of monitoring data; and
    in response to receiving a monitoring request from the requestor application, dynamically optimize a mapping of the received request to the collection of monitoring modules.

9. The computer program product of claim 8, wherein dynamically optimizing the mapping comprises program code to compute a suitability score and an expected cost projected for each monitoring module of the collection.

10. The computer program product of claim 9, wherein the suitability score is derived from a combination of monitoring module attributes, the attributes including functional overlap, persistent suitability, and availability.

11. The computer program product of claim 9, further comprising program code to select at least one monitoring module from the collection satisfying the suitability score.

12. The computer program product of claim 9, further comprising program code to dynamically manage the layer, including program code to load balance the monitoring modules in the layer.

13. The computer program product of claim 11, further comprising program code to spawn at least one new monitoring module to the layer responsive to an increased demand on the collection of monitoring modules.

14. The computer program product of claim 12, wherein the new monitoring modules provide a feature selected from the group consisting of: redundant functionality, supplemental monitoring functions to one or more existing monitoring modules, and a combination thereof.

15. A system comprising:
  a processing unit operatively coupled to memory;
  one or more tools in communication with the processing unit, the tools to:
    configure a software layer positioned between a requestor application and a shared service provider;
    populate the layer with a collection of one or more monitoring modules, wherein each monitoring module monitors application resource usage and each monitoring module is an xlet configured for a specific purpose, wherein selection and activation of the xlet provides at least two redundant paths of monitoring data; and
    in response to receiving a monitoring request from the set of requestor applications, dynamically optimize a mapping of the received request to the collection of monitoring modules.

16. The system of claim 15, wherein dynamically optimizing the mapping comprises the tools to compute a suitability score and an expected cost projected for each monitoring module of the collection, wherein the suitability score is derived from a combination of monitoring module attributes, the attributes including functional overlap, persistent suitability, and availability.

17. The system of claim 16, further comprising the tools to select at least one monitoring module from the collection satisfying the suitability score.

18. The system of claim 15, further comprising the tools to dynamically manage the layer, including program code to load balance the monitoring modules in the layer.

19. The system of claim 17, further comprising the tools to spawn one or more new monitoring modules to the layer responsive to an increased demand on the collection of monitoring modules.

20. The system of claim 18, wherein the new monitoring modules provide a feature selected from the group consisting of: redundant functionality, supplemental monitoring functions to one or more existing monitoring modules, and a combination thereof.

* * * * *